Aug. 6, 1935.  W. L. SMITH  2,010,277
SAFETY SNAP HOOK
Filed Oct. 1, 1934
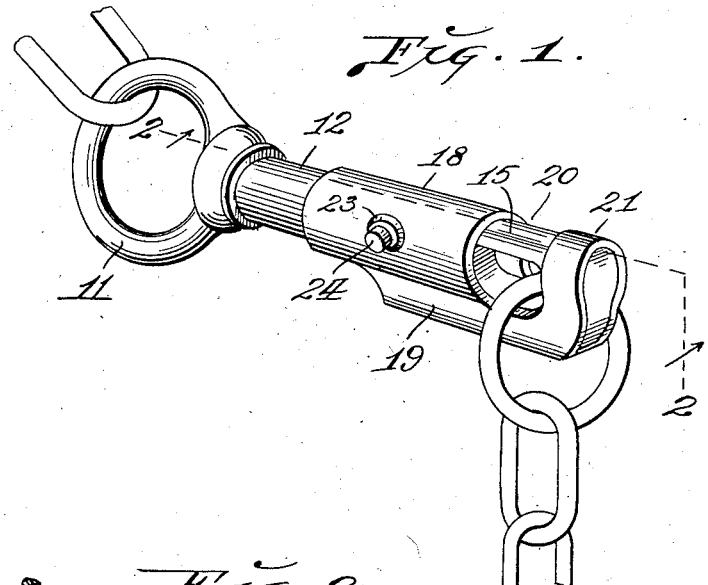
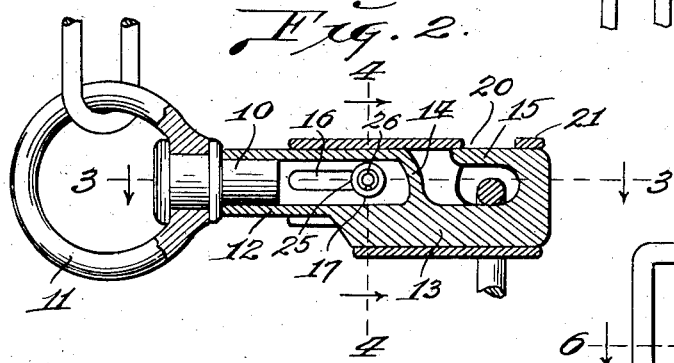
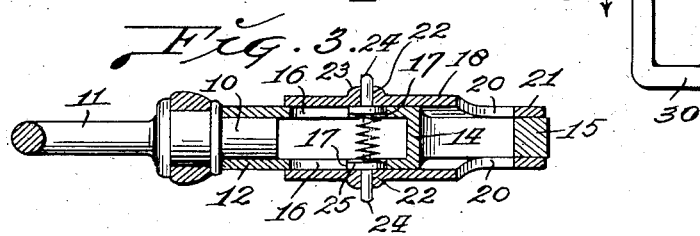
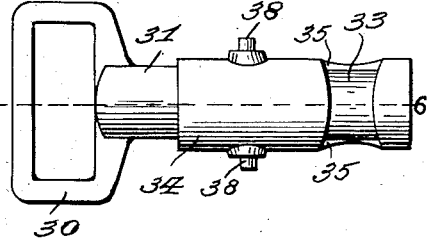
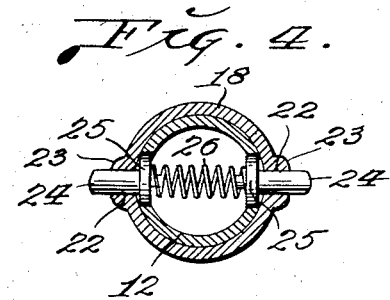
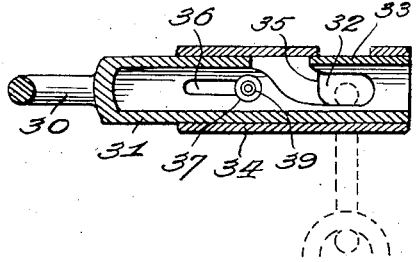
INVENTOR,
WILLARD L. SMITH.
BY Martin P. Smith ATTY.

Patented Aug. 6, 1935

2,010,277

UNITED STATES PATENT OFFICE 2,010,277

SAFETY SNAP HOOK

Willard L. Smith, Venice, Calif.

Application October 1, 1934, Serial No. 746,333

6 Claims. (Cl. 24—241)

My invention relates to a safety snap hook and the construction herein disclosed is an improvement on the snap hook forming the subject matter of U. S. Letters Patent No. 1,240,381 issued to me September 18, 1917.

The principal objects of my present invention are, to generally improve upon the construction of the snap hook disclosed in my aforesaid patent, as well as other similar types of snap hooks, to provide a snap hook having a pair of latching devices that are effective in securing the hook in closed position so as to effectually prevent the disengagement or removal of the ring or other member that is engaged by the hook and further, to provide a snap hook of the type used in securing the rings of harness, animal leashes and the like that has great mechanical strength combined with simplicity of construction and ease of manipulation in both opening and closing movements.

With the foregoing and other objects in view my invention consists in certain novel features of construction and arrangements of parts that will be hereinafter more fully described and claimed and illustrated in the accompanying drawing in which:

Fig. 1 is a perspective view of a safety snap hook constructed in accordance with my invention.

Fig. 2 is a longitudinal section taken on the line 2—2 of Fig. 1.

Fig. 3 is a horizontal section taken on the line 3—3 of Fig. 2.

Fig. 4 is an enlarged cross section taken on the line 4—4 of Fig. 2.

Fig. 5 is a plan view of a modified form of the hook.

Fig. 6 is a longitudinal view taken on the line 6—6 of Fig. 5.

Referring by numerals to the accompanying drawing and particularly to the form of hook illustrated in Figs. 1 to 4 inclusive, 10 designates a short substantially cylindrical shank 10 of metal, upon one end of which is swiveled a ring 11.

Rigidly secured to the forward end of shank 10 and projecting forwardly therefrom, is a tubular member 12 that forms the rear portion of the body of the hook.

Formed integral with and projecting forwardly from the lower portion of tubular body 12, is a rib 13 that forms the backbone of the hook and imparting to the latter the necessary strength.

The forward end of the tubular body is closed by an integral wall 14 that merges with the upper surface of the rib 13.

Formed integral with the forward end of rib 13 on top thereof, is a rearwardly presented hook 15, the rear end of which is spaced apart from the wall 14 at the forward end of body 12. The space between the horizontal portion of hook 15 and the upper face of rib 13 in front of wall 14 is adapted to receive a ring hook or other member to which the snap hook is applied.

Formed through the wall of tubular body 12, between front wall 14 and the forward end of shank 10, are horizontally disposed slots 16 that are shaped somewhat similar to ordinary keyholes, that is, each slot comprises a horizontally disposed portion of uniform width and in the forward end thereof is formed a circular opening such as 17, the diameter of which is greater than the width of slot 16.

Mounted to slide freely upon the tubular body 12, is a sleeve 18 of metal and formed integral with the lower portion thereof, is a housing 19 that extends beneath rib 13.

Formed in the forward portion of this sleeve is a notch 20 that extends downwardly on the sides of said sleeve to the upper edges of the side walls of the housing 19 and the formation of this notch provides a short sleeve 21 that normally surrounds the forward portion of hook 15 and the forward portion of rib 13.

Formed through the sides of sleeve 18, are horizontally disposed apertures 22 and surrounding same on the outer face of the sleeve, are integral collars or flanges 23.

Arranged to slide freely through the apertures 22, are short horizontally disposed pins 24, the diameter of which is such that they will readily pass through the slots 16 in body 12 and secured to the inner ends of these pins are circular discs 25 that are adapted to enter the enlarged forward ends 17 of the keyhole shaped openings.

Interposed between the discs 25, is a small expansive coil spring 26.

When a ring or the like is engaged in the hook 15 at the forward end of the device and the sleeve 18 is at its forward limit of movement, the forward end of the upper portion of the body of the sleeve overlies the opening between the hook 15 and wall 14, thereby securing the ring or other member against removal from the hook.

The sleeve is secured in its forward position as a result of the engagement of discs 25 in the enlarged forward ends 17 of the keyhole openings 16 and obviously the sleeve cannot be moved rearward to permit the engaged ring to be removed from the hook unless both pins 24 carrying disc 25 are pressed inward by pressure of the thumb and finger and when this is done the discs are removed from the enlarged forward ends of the keyhole openings and the sleeve may now be moved rearwardly on tubular body 12 until the notch 20 coincides with the opening between the hook 15 and wall 14.

With the parts so positioned the ring or other member engaged by the hook may be readily removed and when the hook is again applied to a ring or the like if it is desired to move the sleeve forward to close the hook, it is only necessary for the thumb and fingers to engage the projecting collars or flanges 23 and impart forward movement to the sleeve.

When the sleeve has been moved forward to its limit of movement, the pressure exerted by spring 26 will force the discs 25 into the enlarged ends of the opening 16, thereby effectually securing the sleeve against rearward movement.

In Figs. 5 and 6 I have illustrated a modified form of hook that may be utilized in the production of the smaller and cheaper forms of safety snap hooks and in this construction, a loop or ring 30 is formed integral with the rear end of a tubular body 31.

Formed in the upper forward portion of the tubular body, is a downwardly and forwardly extending notch 32 that provides a rearwardly presented notch 33 at the forward end of said body.

Mounted to slide freely on the tubular body 31, is a sleeve 34 in the forward portion of which is formed a downwardly extending notch 35, which when the sleeve is moved rearwardly, coincides with the upper end of notch 32, so as to permit a ring or the like to be inserted in said last mentioned notch below the hook 33.

Formed in the sides of tubular body 31, are horizontally disposed keyhole shaped slots or openings 36, the enlarged forward ends thereof being adapted to receive discs 37 that are carried on the inner ends of pins 38. These pins are arranged to slide through openings in the sides of sleeve 34 and interposed between the discs 37, is an expansion coil spring 39.

The operation incident to the engagement and release of a ring or the like from the hook at the forward end of the device is practically the same as the operations hereinbefore described in connection with the form of hook illustrated in Figs. 1 to 4 inclusive.

An especially desirable feature of my invention is, that the sleeve is positively secured when at its forward limit of movement or while it is in position to retain the engaged ring in the hook, for in order to permit the sleeve to move rearwardly so that the engaged ring may be removed from the hook, it is necessary to push both disc carrying pins inward so that said discs are entirely removed from the enlarged ends of the keyhole shaped openings before the sleeve is released.

As a result of this arrangement, it is practically impossible for an animal that is tethered by a flexible member that includes the snap hook to open the hook by pressing the same against the ground or part of a building or other stationary object.

Thus it will be seen that I have provided a safety snap hook that is relatively simple in construction, inexpensive of manufacture and very effective in performing the functions for which it is intended.

It will be understood that minor changes in the size, form and construction of the various parts of my improved safety snap hook may be made and substituted for those herein shown and described without departing from the spirit of my invention, the scope of which is set forth in the appended claims.

I claim as my invention:

1. A snap hook, comprising a body provided at its forward end with a hook, a sleeve mounted for sliding movement on said body and provided in its forward portion with a notch that is adapted to register with the opening of the said hook and a pair of independent operable latches carried by said sleeve and cooperating with said body to secure said sleeve at the forward end of its movement upon said body.

2. In a snap hook, a body provided at its forward end with a hook, a sleeve mounted for sliding movement on said body and provided in its forward portion with a notch that is adapted to register with the opening into said hook, said body having a slot, one end of which is enlarged, a pin arranged for sliding movement through the wall of said sleeve, the inner end of which pin is enlarged for engagement in the enlarged end of said slot and a spring for yieldingly resisting the inward movement of said pin.

3. In a snap hook, a body provided at its forward end with a hook, a sleeve mounted for sliding movement on said body and provided in its forward portion with a notch that is adapted to register with the opening into said hook, said body having a slot, one end of which is enlarged, a pin arranged for sliding movement through the wall of said sleeve, the inner end of which pin is enlarged for engagement in the enlarged end of said slot, a spring for yieldingly resisting the inward movement of said pin and a flange formed on the outer face of the sleeve around the opening that is occupied by said pin.

4. In a snap hook, a body provided at its forward end with a hook, a sleeve mounted for sliding movement on said body and provided with a notch that is adapted to register with the opening into said hook, the sides of said body being provided with longitudinally disposed slots, the forward ends of which slots are enlarged, pins arranged for sliding movement through openings in the sides of said sleeves, discs on the inner ends of said pins, which discs are adapted to occupy the enlarged openings at the forward ends of said slots and an expansive spring arranged between said discs.

9. In a snap hook, a body provided at its forward end with a hook, a sleeve mounted for sliding movement on said body and provided with a notch that is adapted to register with the opening into said hook, the sides of said body being provided with longitudinally disposed slots, the forward ends of which slots are enlarged, pins arranged for sliding movement through openings in the sides of said sleeves, discs on the inner ends of said pins, which discs are adapted to occupy the enlarged openings at the forward ends of said slots, an expansive spring arranged between said discs and flanges formed on the outer face of said sleeve around the openings that are occupied by said pins.

6. In a snap hook, a body, a hook formed on the forward end thereof, a reenforcing rib formed integral with and connecting said body and hook, a sleeve mounted for sliding movement on said body and rib, said sleeve having a notch that is adapted to coincide with the opening into said hook, said body provided with a longitudinally disposed slot, the forward end of which is enlarged, a pin arranged for sliding movement through the wall of the sleeve, the inner end of which pin is enlarged for engagement in the enlarged end of the slot and a spring for yieldingly resisting the inward movement of said pin.

WILLARD L. SMITH.